United States Patent
Conn, Jr. et al.

[15] 3,668,769

[45] June 13, 1972

[54] ROLL DIFFUSION BONDING METHOD

[72] Inventors: Charles E. Conn, Jr., Manhattan Beach; Robert P. Neumann, Torrance, both of Calif.

[73] Assignee: North American Rockwell Corporation

[22] Filed: Jan. 27, 1969

[21] Appl. No.: 801,913

Related U.S. Application Data

[62] Division of Ser. No. 605,419, Dec. 28, 1966, Pat. No. 3,444,608.

[52] U.S. Cl. .................................29/421, 72/56, 72/706, 29/423, 29/427, 29/471.1

[51] Int. Cl. ....................................................B23p 17/00

[58] Field of Search ............29/423, 426, 427, 421 M, 471.1

Primary Examiner—John F. Campbell
Assistant Examiner—Richard Bernard Lazarus
Attorney—William R. Lane, Charles F. Dischler and Harold H. Card, Jr.

[57] ABSTRACT

This disclosure pertains to a method of facilitating removal of magnetically responsive filler elements from an assembled and bonded non-magnetically responsive workpiece by subjecting the workpiece to a magnetic force in an amount sufficient to distort and loosen the filler elements.

4 Claims, 6 Drawing Figures

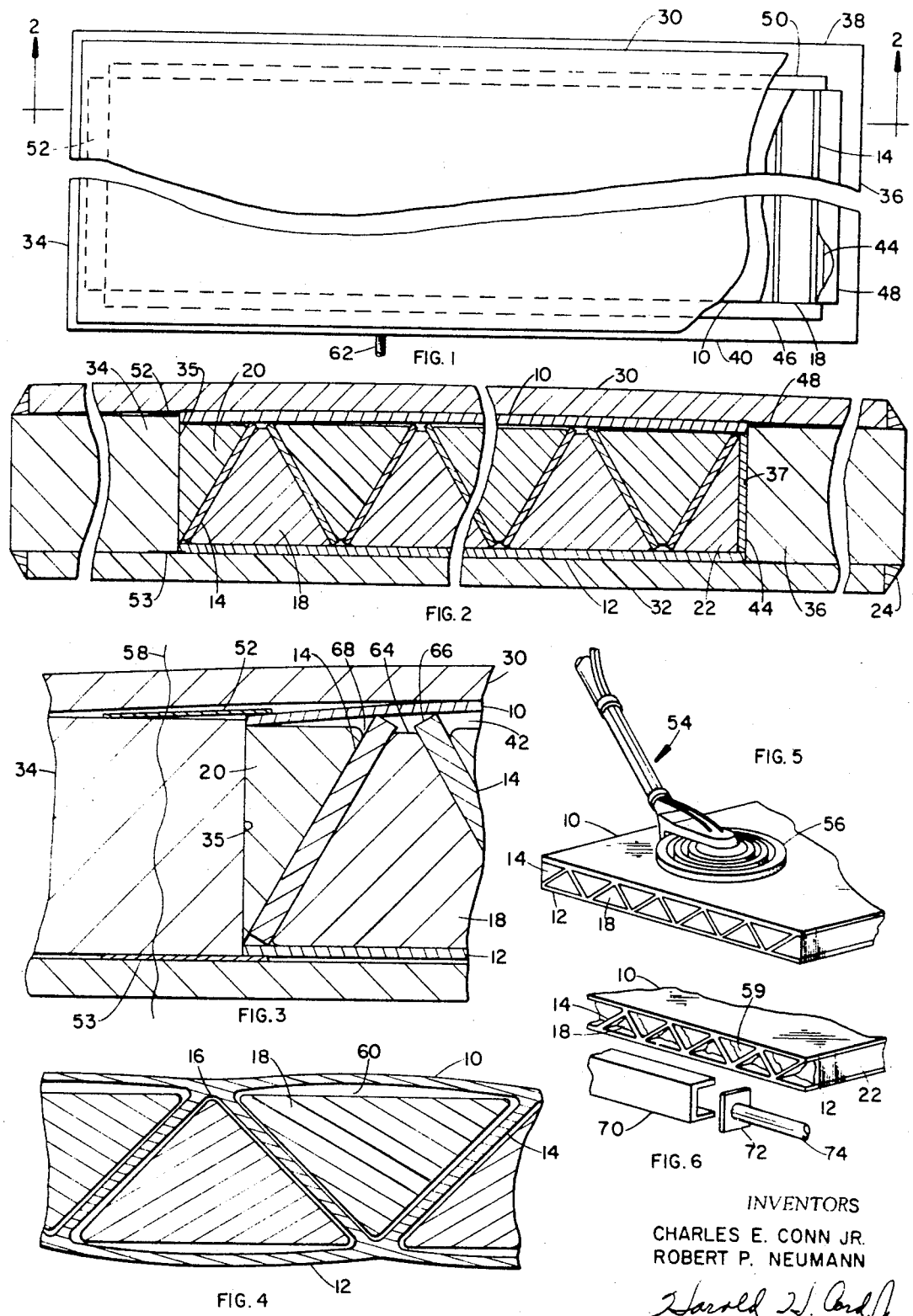

ROLL DIFFUSION BONDING METHOD

This is a division of application Ser. No. 605,419 filed Dec. 28, 1966, now U.S. Pat. No. 3,444,608.

This invention pertains to a method for mass production of articles by roll diffusion bonding, especially but not exclusively planar articles such as lightweight panels of thin-walled sandwich type construction. More particularly, this invention concerns a method for achieving improved dimensional accuracy and structural integrity in the final part by rapid, economical and practical means adapted for modern mass production of articles such as the mentioned type panels.

Lightweight panels of sandwich type are useful in structures involving great strength at high temperature wherein economy of weight is a prime consideration, such as in the fabrication of high speed aerial or space missiles and vehicles. In addition, great precision in such workpieces is necessary in order to assemble the component parts of a massive vehicle or missile. Such panels typically comprise two confronting outer face sheets uniformly spaced apart in substantially parallel relationship with a plurality of internal upstanding ribs or angular corrugations permanently joined to both stated sheets. Of the various materials suitable for the stated use, titanium is widely used because of its high strength and light weight, although other and different materials may be used in the article produced by the method disclosed herein. The known prior art includes various methods for fabricating titanium sandwich type panels by roll diffusion bonding of the internal ribs to the face sheets starting with a relatively thick workpiece panel and applying heat and pressure through rollers to form permanent solid state bonded joints between the workpiece components, and incidentally effecting a substantial reduction in panel thickness with commensurate elongation of the same. To control and distribute the loads and deformation effects during such rolling, filler material in the typical form of mandrels or the like of suitable material such as mild steel are used to occupy the space between the internal ribs or corrugations, the steel filler material being compressed and elongated along with the titanium workpiece components during the rolling operation. The mandrels and workpiece are typically encased within a steel envelope prior to the rolling operation, and the entire pack subjected to rolling force.

In the foregoing process, it has been a persistent and predominant problem to achieve defect-free panels having the requisite size, strength and structural integrity for use in vehicles and missiles of the type mentioned. A principal cause of the stated problem is non-uniform load or stress effects which produce localized wrinkling, buckling or tearing of the face sheets or delicate internal rib structure during the rolling operation. Moreover, since the steel mandrels or other filler and envelope materials used in the pack are deformed and joined to the titanium workpiece surfaces within the envelope during the rolling operation, the difficulty and high cost of removing such mandrels and envelope materials from the workpiece without damaging the latter is a major deterrent to the widespread adoption of roll diffusion bonded panels of the type described above. Thus, the high incidence of defects from the stated causes is directly associated with a high percentage of rejection of final articles, with the result that production costs for panels of the mentioned type are prohibitive in many cases.

Accordingly, it is a principal object of the invention in this case to provide a strong, dimensionally accurate and distortion-free roll diffusion bonded panel having improved structural integrity.

It is another object of this invention to provide a method for making roll diffusion bonded articles in accordance with the above stated objects which may be practiced with improved ease, economy and rapidity.

It is another object in this case to provide a method for roll diffusion bonded objects having improved accuracy in controlling the structural quality of the article during its fabrication, thus avoiding a high incidence of rejection in the mass production of such articles.

It is a further object in this case to provide a method of making an article as mentioned in the above objects by means permitting removal of envelope materials and mandrels or the like from such article with improved rapidity, ease, economy and lessened risk of deleterious effects upon the article as a result of the mandrel and envelope removal steps.

Other objects and advantages will become apparent upon a close reading of the following detailed description of an illustrative embodiment of the inventive concept, reference being had to the accompanying drawings, wherein:

FIG. 1 is a fragmented plan view of an envelope containing workpiece and tooling components arranged according to the inventive concept in this case, FIG. 2 is a cross-sectional view taken along line 2—2 of FIG. 1 showing the structure thereof prior to the rolling operation, FIG. 3 is an enlarged cross-sectional view showing a portion of the structure from FIG. 2, FIG. 4 is an isolated cross-sectional view corresponding generally with FIG. 2 but showing a finished article fabricated in accordance with the inventive principles disclosed herein after its removal from the tooling envelope following the rolling operation, and with internal pressure applied, FIG. 5 is a fragmented view in perspective, of a workpiece removed from its envelope but containing filler material sought to be separated from within the workpiece, and FIG. 6 shows a perspective view of a workpiece portion during a later step in the mandrel removal process than that depicted in FIG. 5.

Referring to FIGS. 2 and 4, for example, it may be seen that the inventive method in this case may illustratively be used in the fabrication of an article essentially comprising upper and lower face sheets 10 and 12, respectively, arranged in confronting and spaced-apart relationship and permanently maintained in such relationship by a plurality of thin-walled ribs or webs 14 extending between the stated sheets and secured thereto by solid state diffusion bonding. Fabrication of the foregoing article begins with arrangement of the workpiece components in the general relationship desired for the final part as shown in FIG. 2, which may illustratively involve convergence of each adjacent pair of rib sections 14 in alternate sequence to form nodes 16. With the arrangement thus shown, a plurality of mandrels which function as filler material between the workpiece internal components are arranged between ribs 14 and face sheets 10 and 12 as illustrated by mandrels 18 seen in FIGS. 2-5, inclusive. Mandrels 20 and 22 are essentially half the size of mandrels 18 due to their location at each end of the article shown in FIG. 2.

Prior to the rolling operation described below, the foregoing items 10 through 22 described above are situated and arranged in the relationship shown by FIG. 2 within a retort or envelope comprising a yoke portion of rectangular shape shown in FIG. 1 securely joined to relatively thick and substantially parallel top and bottom cover plates 30 and 32 best seen in FIG. 2. The stated yoke defines a cavity 42 and may conveniently be formed by parallel side pieces 34 and 36 securely joined to parallel end pieces 38 and 40 by suitable means such as welding. Alternatively, the yoke may be initially formed as a single unitary member. The envelope plus its entire contents is herein termed the pack.

Although as stated above the selection of particular materials in practicing the novel method disclosed herein is not critical to the use of the inventive concept, workpiece components 10, 12 and 14 illustratively comprise titanium, while mandrels or filler bars 18, 20 and 22 comprise mild steel. In any case, filler materials appropriate for use with a particular workpiece material should preferably have compression characteristics generally corresponding to those associated with the chosen workpiece materials at the temperatures associated with the rolling operation. Moreover, a particular advantage is had when such filler materials are responsive to magnetic force in contrast with relative insensitivity of the workpiece material to such force, for reasons appearing more clearly hereinbelow. In connection with the preparation of a pack by preplacement of panel and filler materials in the yoke, it has been found that a certain critical relationship exists between the initial density of the pack before it is rolled and the final density of the pack after the rolling operation is complete, particularly with regard to the pack width. The foregoing relationship is referred to herein as the solidity factor, and is expressed as a percentage ratio of the actual density of materials within cavity 42 to the theoretically ideal density of such materials if cavity 42 were completely filled with workpiece and filler materials having the same proportion of relative mass as the materials actually used.

In determining the solidity factor of a pack before rolling the same, it is necessary for the height of side and end pieces 34–40 comprising the yoke to be substantially uniform. Similarly, the inner surfaces 35 and 37 of side pieces 34 and 36, respectively, of the yoke should be substantially uniformly planar whereby the width of cavity 42 will be substantially constant throughout the total length of the yoke. Bottom envelope portion 32 may advantageously be joined to the yoke in the relationship shown by FIG. 2 by appropriate means such as welding as suggested by fillet 24 before the contents of the yoke are placed therewithin.

With the yoke thus formed, workpiece components 10, 12 and 14 are arranged within this yoke together with mandrels 18, the stated elements being sized and arranged to substantially fill the entire enclosed volume defined by the yoke. During the foregoing step, as each member 14, 18, 20 and 22 is placed within the yoke, their volumetric displacement must be determined. The length of all the foregoing items can quite easily be precisely maintained constant and identical by a simple trimming operation, whereby end members 38 and 40 are snugly contacted by the mentioned items with substantially uniform force. Similarly, face sheets 10 and 12 are accurately formable by precision trimming of the same as necessary to fit closely within yoke members 34, 36, 38 and 40 as suggested by FIG. 21. However, the widths of items 14, 18, 20 and 22 are not usually maintainable with precise uniformity in every case due to manufacturing tolerances, creep characteristics, and other causes. For example, when mandrels 18 are formed by cold drawing, as is often the most convenient and economical method of fabricating such tooling items, the widths thereof normally vary between individual mandrels and may even be non-uniform between the opposite ends of each mandrel. Due to the considerations described above, accurate determination of the volumetric displacement of each separate item 14, 18, 20 and 22 cannot be economically achieved on a mass production scale by a multitude of individual dimensional measurements at a plurality of locations along the total length of every such item, especially where the workpiece typically comprises from 150 to 300 ribs 14 and a like number of mandrels 18 having a length as much as 7 to 10 feet to form a single panel.

Accordingly, it is an important feature of the inventive concept in this case that the volumetric determination required to solve for the solidity factor as defined hereinabove for a penal illustratively comprising 6AL4V titanium workpiece ribs 14 and steel mandrels 18, 20 and 22, is achieved by the following mathematical relationships and equivalents thereof:

Solidity factor $= (X_t + X_s/X_p)$ % where:

$X_t$ is the mean theoretical width of all titanium ribs 14 in cavity 42;

$X_s$ is the mean theoretical width of all steel mandrels 18, 20 and 22 in cavity 42; and $X_p$ is the actual measured width of yoke cavity 42 between inner surfaces 35 and 37 of side members 34 and 36, respectively, as seen from FIG. 2, for example.

In the foregoing context, the mean theoretical width $X_t$ of all ribs 14 is computed as follows:

$X_t = (W_t/L_t \times T_t \times D_t)$ where:

$W_t =$ the total actual weight of all ribs 14 in pounds;
$L_t =$ the actual length of all ribs 14 in inches (constant);
$T_t =$ the thickness of the workpiece panel before rolling = the height of cavity 42, and
$D_t =$ the density of the material in ribs 14.

Similarly, the mean theoretical width $X_s$ of all steel mandrels 18, 20 and 22 is computed as follows:

$X_s = (W_s/L_s \times T_s \times D_s)$ where $W_s =$ the total actual weight of all mandrels in pounds;
$L_s =$ the actual length of all mandrels in inches (constant);
$T_s = T_t$ (see above), and
$D_s =$ the density of the material in mandrels 18, 20, 22.

The following example is intended to illustrate use of the foregoing relationships in fabricating a workpiece panel having a pre-rolling size of 48 inches wide by 36 inches long involving assumed values as stated below:

Measured height of cavity 42 = 1.006 inches.
Measured width of cavity 42 = $X_p$ = 48.25 inches.
Total number of mandrels 18 = 142 plus 2 half-size mandrels 20, 22 = 143.
Cross-sectional area of mandrels 18 = 0.236 sq. in.
Total cross-sectional area of mandrels 18, 20, 22 = 143 × 0.236 = 33.8 sq. in.
Total number of ribs 14 of 6AL4V titanium = 143.
Cross-sectional area of ribs 14 = 0.0157 sq. in.
Total cross-sectional area of ribs 14 = 143 × 0.0157 = 2.25 sq. in.
Length of mandrels and ribs = 36 inches.
2 titanium face sheets 10 and 12, each 48 inches wide and 0.125 inches thick, total cross-sectional area = 48 × 0.125 × 2 = 12 sq. in.

The significance of a close tolerance control such as ±0.002 inches is apparent in the area calculation considering the large number of detail parts in the assumed case.

Total actual weight of items 10, 12 and 14 = 82.1 pounds.
Total actual weight of items 18, 20 and 22 = 345 pounds.

$$X_t = \frac{82.1}{36 \times 1.006 \times .100} = 14.15$$

$$X_s = \frac{345}{36 \times 1.006 \times .283} = 33.6$$

$$\text{Solidity factor} = \frac{14.15 + 33.6}{48.25} = \frac{47.75}{48.25} = 98.9\%.$$

Since the solidity factor thus computed is less than 99.5 percent, the addition of material to cavity 42 in the assumed case is required to achieve the preferred value. It is a significant feature of the concept disclosed herein that the solidity factor comprising the percentage computed illustratively hereinabove must be preferably at least 0.995 before the pack is closed and the rolling operation begun. If the solidity factor as defined herein is less than the foregoing value, correction of the condition is necessary, and is most conveniently accomplished by the addition of material in the from of one or more shims along the sides of the yoke cavity 42 as indicated by shim 44 in FIG. 2, for example. The length and thickness of shim 44 in the assumed illustrative case is determined from the calculations shown above. Thus, since the total volume of cavity 42 is known, shim size is determined by computing shim dimensions capable of resulting in the stated value when added to the computed volume of workpiece and mandrel materials. As applied to the case illustratively assumed above, since the computed solidity factor of 98.9 percent is less than the preferred value of 99.5 percent, addition of a shim as required to achieve the latter value will require a thin steel strip of 36 inch length, 1.006 inches height, and a width equivalent to the difference between 48.25 inches and 47.75 inches, or 0.50 inch, positioned within cavity 42 as shown by shim 44 in the drawing. After preparation of the pack, and closure of the envelope as by welds 24, evacuation of atmosphere therefrom may be accomplished by use of a vacuum connection 62 and the pack is subjected to heating and rolling.

The rolling operation on the assembly shown by FIG. 2, for example, during which the workpiece thickness may be reduced as much as 60 percent or more, produces extreme roller compression forces and is accompanied by elevated heating necessary to produce solid state diffusion bonding between ribs 14 and face sheets 10 and 12. These operating conditions simultaneously produce incomplete but nonetheless rather tenacious bonds between the envelope elements 34, 36, 38, 40, 30 and 32 as well as mandrels 18, 20, 22 and the contacting surfaces of elements 10, 12 and 14 adjoining each of the respective envelope and filler elements. Due to the extremely high order of correspondence between actual density to theoretically achievable density of the materials in cavity 42 of the envelope before rolling, greater uniformity and intensity of surface contact between the envelope and filler materials and workpiece surfaces results from the method described above than that associated with the generally haphazard methods of pack preparation known to the prior art. Accordingly, removal of workpieces from the envelope and of such mandrels from roll diffusion bonded articles in a pack which was prepared using the solidity factor method described above is a particularly sever problem, with commensurately high risk of damage to such articles resulting from application of force to remove such items. The leaching of mandrels from the finished article by immersion of a pack in a leaching solution after fabrication of the article is otherwise complete, in the manner familiar to the prior art, is distinctly unsuited to the instant case from an economic standpoint due to inability of the liquid bath to penetrate between the tightly adhering mandrel and workpiece surfaces.

Accordingly, it is an important feature of the inventive concept in this case that the magnetic properties of the materials in the pack are used in the method for removing mandrels 18, 20 and 22 therefrom. Thus, mild steel or the like as suggested for filler material is strongly responsive to magnetic force, whereas titanium and some of its alloys are magnetically inert in the sense that they are neither attracted nor repelled by magnetic force. As a result of the foregoing relative properties between the workpiece and filler materials illustratively suggested for practicing the method disclosed herein, removal of mandrels is accomplished by subjecting the workpiece and filler materials contained therein to magnetic force having sufficient field strength to distort the mandrels. While various methods and means may be used to accomplish the stated objective, use of a portable magnetic hammer of the general type shown in U. S. Pat. No. 2,976,907 issued Mar. 28, 1961, or variations thereof, has been found very effective.

Removal of the mandrels may appropriately begin by first opening the pack by removing upper and lower envelope portions 30, 32, side portions 34, 36 and end portions 38, 40 of the envelope yoke. In connection with the envelope removal step, it is a significant feature of the inventive concept in this case that means are provided in the pack prior to the rolling operation for facilitating removal of the envelope components. Thus, a plurality of relatively thin foil strips such as strips 46, 48, 50 and 52 of titanium are preplaced in the pack during initial preparation thereof as suggested in FIGS. 1, 2 and 3 so as to overlap the planes of contact between face sheets 10 and 12 with the inner vertical surfaces of yoke members 34, 36, 38 and 40. The foregoing relationship is best seen, for example, from FIGS. 2 and 3 showing foil strips 52, 53 preplaced between yoke member 34 and covers 30 and 32 of the envelope assembly, respectively. The overlapping relationship thus shown for foil strips 52 and 53 is identical for all the remaining foil strips with respect to the other envelope components.

The particular advantage in use of titanium foil strips such as 46, 48, 50 and 52, for example, is best appreciated by consideration of the results of the roll diffusion bonding operation without such foil strips. Thus, referring to FIG. 2, it may be seen that yoke members 34 and 36 are permanently joined by a solid state bond to upper and lower envelope covers 30 and 32, whereby removal of the workpiece from the envelope after such rolling operation involves the use of a flame cutting torch or the like to separate the envelope components thus surrounding the workpiece. The cutting line for separating elements 30 and 32 from yoke element 34, for example, would necessarily have to coincide substantially with the vertical plane defined by surface 35 in FIG. 2, with the result that molten material from the stated envelope components mingles with molten material from the workpiece elements and fuses them together so that mechanical cutting or grinding after the flame cutting operation is necessary to separate the mentioned parts. This naturally reduces the size of the workpiece and prolongs the fabrication period involved in completing workpiece panels, increasing the final cost thereof.

The foregoing difficulties are avoided by preplacement of titanium foil strips such as 52 and 53 shown in FIGS. 2 and 3, for example, it being understood that titanium bonds incompletely with steel and that the rolling process discussed herein will provide weaker bonds of titanium to steel than those produced between steel to steel or titanium to titanium surfaces. Due to the foregoing phenomena, the foil functions essentially as a stop-off medium. Accordingly, after the rolling operation is complete, flame cutting may occur along a line generally defined by line 58 in FIG. 3, for example, which passes through both foil strips 52 and 53. Similarly, flame cutting may occur through the remaining yoke members 36, 38, and 40 in the same manner as member 34 shown in FIG. 3. Thereafter, a single hammer blow on a chisel or the like inserted at the location of each of the foil strips 52 and 53, for example, is often sufficient to cause cover members 30 and 32 to pop off the pack assembly in the manner of a spring due to the residual stresses therein remaining after the rolling operation.

Referring to the removal of mandrels from the workpiece, it may be seen from the illustrative embodiment suggested by FIG. 5 that all of the envelope portions have been removed, after which magnetic hammer 54 is moved progressively across one surface of the workpiece in the relationship shown, and is repeatedly energized to expose all of the stated surface and underlying components to the concentrated local magnetic field produced by coil 56 of hammer 54. If necessary or desirable following the use of hammer 54 in the foregoing manner, the workpiece assembly shown in FIG. 5 may be inverted and the magnetic hammering process repeated, whereby the same parts are progressively subjected to magnetic force from the opposite direction. It will be understood that, in the case of small workpieces or relatively huge coils, all the required magnetic force may be applied simultaneously to all portions of the workpiece assembly rather than progressively in the manner described for larger workpiece assemblies and shown in FIG. 5. Moreover, the orientation of flux lines in the field generated by coil 56 will depend upon the size, shape and mass distribution of the filler material which is sought to be removed, and preferably should be arranged to produce the maximum possible torque or other distorting force in the mandrels. Thus, flux lines passing through titanium face sheet 10 or 12 shown in FIG. 4 by magnetic hammer 54 will result in slight but definite and critically important distortion and consequent relative movement between mandrels 18 and titanium workpiece elements 10, 12 and 14. Such distortion is normally very localized and temporary in nature, since the resilient properties of mandrels 18, for example, will restore the mandrels to their undisturbed state after removal of magnetic force from coil 56. However, the stated distortion and consequent slight relative movement between mandrels 18 and the workpiece has been found sufficient to reduce somewhat the holding or retaining force between the workpiece and the mandrels, as a result of which the mandrels are more readily removable from the workpiece panel, and/or more amenable to the pressurizing process step suggested illustratively by FIG. 6.

Referring to FIG. 6, it may be seen that a leaching step may be accomplished by immersion of the workpiece shown in FIG. 5 in a container of solution adapted to dissolve filler material of mandrels 18, and that the mandrel ends are exposed to such solution for sufficient time to remove a small portion thereof. Leaching may be accomplished as known to the prior art and taught by U. S. Pat. No. 3,044,160 issued July 17, 1962. The foregoing step results in a cavity at each of the mandrel ends such as cavity 59. Thereafter, the workpiece panel may be subjected to one or more applications of fluid pressure by suitable means which may take the form of a manifold as shown by manifold 70 adapted to cover the end of the workpiece in sealing contact therewith. End closure member 72 having a suitable pressure line 74 connected therewith may be joined to manifold 70 in sealing relationship or may be integrally formed thereon, together with another end closure member oppositely corresponding to item 72 for sealing the opposite end of manifold 70 (not shown). Manifold 70 is adapted to cover cavities 59 and to be sealed to the confronting end of the workpiece panel by suitable means such as pressure tape or the like. Similarly, another manifold oppositely corresponding to manifold 70 is provided on the opposite end of the workpiece panel and sealed thereto. Thereafter, fluid pressure through line 74 is applied to fill cavities 59 and to traverse the length of the workpiece panel, particularly between mandrels 18 and face sheets 10 and 12 thereof, producing gaps 60 shown in FIG. 4, thereby further breaking any remaining bonded areas between the mandrel and workpiece surfaces. The pressure applied through line 74 may be varied and/or cycled repeatedly if useful or necessary in any particular case to achieve the maximum possible loosening effect on the mandrels. Moreover, it will be understood that the pressurizing step thus suggested by FIG. 6 and discussed above may be separately used with or without the magnetic hammering step described in connection with FIG. 5.

In addition, if the leaching process mentioned hereinabove and known to the prior art is considered necessary or desirable due to high residual stresses in the workpiece panel which continue to grip the mandrels 18 in the event that the methods suggested in FIGS. 5 and 6 do not sufficiently loosen the mandrels for removal thereof, the magnetic hammering and pressurizing processes thus described have been found to result in improved capability of leaching fluid to traverse throughout the length of the workpiece panel. As a result of either or both the magnetic hammering and pressurizing processes, minute gaps between the mandrel and workpiece surfaces generally corresponding to gap 60 are found to result, although it will be understood that gap 60 in FIG. 4 is exaggerated for the sake of clarity. Depending upon particular workpiece and mandrel sizes and materials, gap 60 may not be continuous or uniform in location throughout the workpiece, but in any case will result in a significant increase in the ability of the leaching solution to penetrate within the workpiece and to contact a greater total portion of the mandrel surface whereby the removal process by leaching is greatly accelerated. In this connection, it has been found that immersion periods required to leach mandrels 18 from a panel of the type shown in the drawings of this case can be reduced as much as 50 percent or more, resulting in a vastly more economical process for mass production use in the fabrication of such panels.

In further connection with the improved structural continuity and integrity resulting from the inventive concept disclosed herein, it is a further significant feature of this concept that fillets are achieved at all the joints between ribs 14 and face sheets 10 and 12 due to the provision of excess metal at the ends of ribs 14 and further due to the shaping of mandrels 18, 20 and 22 to provide gaps for accommodating such excess metal. Thus, referring to FIG. 3, it may be seen that end portion 66 of each rib 14 is slightly longer than necessary to extend between face sheets 10 and 12, whereby upper face sheet 10 in FIGS. 2 and 3 is shown to be slightly deformed upwardly. Moreover, surface 64 on mandrel 18 may be seen to lie in a slightly lower horizontal plane than that defined by the top surfaces of the mandrels 18 and 20 on either side thereof as seen particularly in FIG. 3. The force of compression during the rolling operation thus deforms the end portions 66 of ribs 14 and causes the same to flow into the linear gaps or spaces adjacent to and coextensive with surface 64 of mandrel 18 and also the gaps 68 resulting from the rounded corners of the mandrels as illustratively shown in FIG. 3. The avoidance of square edges and sharply defined internal corners in all joints of the workpiece by use of fillets as produced by the mentioned mandrel rounded edges, resulting gaps 68, and excess rib materials 66, results in improved strength and structural integrity by avoiding the localized stress concentrations which would tend to produce cracks or other incipient failures at such corners and edges in a finished workpiece panel.

It will further be understood by those skilled in the art that the solidity factor method of pack preparation disclosed above is applicable to roll diffusion bonding of workpieces other than the sandwich type panels illustratively shown in the drawings and discussed above to explain the novel concept. Thus, the fabrication of reinforced sheets having upstanding ribs or "T" cross-sectional braces secured to such sheets without a permanent covering plate can advantageously be achieved by roll diffusion bonding in packs prepared with initial densities determined according to the teachings set forth herein, either with or without the subsequent use of the magnetic hammering and pressurizing methods discussed above.

While the particular details set forth above and in the drawings are fully capable of attaining the objects and providing the advantages hereinstated, the structure and method thus disclosed are merely illustrative and could be varied or modified to produce the same results without departing from the scope of the inventive concept as defined in the appended claims.

We claim:

1. In a method of forming an article from a plurality of non-magnetically responsive workpiece components and a plurality of magnetically responsive filler elements substantially enclosed within said components and initially assembled in mutual contacting relationship, the steps of:
   subjecting said components and said filler elements to sufficient heat and pressure to bond said components permanently together, and
   loosening said filler elements to facilitate their separation from said workpiece components by subjecting said assembly to magnetic force in an amount sufficient to distort said filler elements.

2. The method set forth in claim 1 above, wherein:
said workpiece components comprise titanium, and
said filler elements comprise steel.

3. The method set forth in claim 1 above, wherein:
said magnetic force is progressively applied by a portable magnetic hammer moved over an external surface of said assembled components and filler elements and in close proximity thereto whereby lines of magnetic flux pass entirely through said article.

4. The method set forth in claim 1 above, further including:
the step of applying fluid pressure to said article at an external location thereon communicating with said filler elements whereby said fluid pressure progressively penetrates between confronting surfaces of said filler elements and said workpiece components.

* * * * *